United States Patent
Johnston et al.

(10) Patent No.: US 6,957,743 B2
(45) Date of Patent: Oct. 25, 2005

(54) MICROBIOLOGICAL WATER FILTER

(75) Inventors: Arthur W. Johnston, Atlanta, GA (US); Arthur F. Johnston, Atlanta, GA (US); Frank A. Williams, Newnan, GA (US); Kenneth D. Hughes, Alpharetta, GA (US)

(73) Assignee: Watervisions International, Inc., Cumming, GA (US)

( * ) Notice: Subject to any disclaimer, the term of this patent is extended or adjusted under 35 U.S.C. 154(b) by 221 days.

(21) Appl. No.: 09/768,115

(22) Filed: Jan. 23, 2001

(65) Prior Publication Data

US 2003/0015467 A1 Jan. 23, 2003

Related U.S. Application Data

(63) Continuation of application No. 09/382,278, filed on Aug. 25, 1999, now Pat. No. 6,187,192.

(51) Int. Cl.$^7$ .............................................. B01D 27/02
(52) U.S. Cl. ..................... 210/496; 210/501; 210/502.1; 210/503; 210/510.1
(58) Field of Search .............................. 210/502.1, 503, 210/506, 510.1, 501, 496

(56) References Cited

U.S. PATENT DOCUMENTS

| | | | | |
|---|---|---|---|---|
| 3,545,622 A | * | 12/1970 | Tilney et al. ................ | 210/496 |
| 3,662,893 A | * | 5/1972 | Humbert, Jr. ................ | 210/315 |
| 4,190,576 A | | 2/1980 | Thomson et al. ........... | 260/122 |
| 4,629,464 A | * | 12/1986 | Takata et al. ............. | 623/23.61 |
| 4,642,192 A | | 2/1987 | Heskett ....................... | 210/638 |
| 4,645,503 A | * | 2/1987 | Lin et al. .................. | 623/23.58 |
| 4,645,604 A | | 2/1987 | Martinola et al. .......... | 210/675 |
| 4,851,122 A | | 7/1989 | Stanley ....................... | 210/501 |
| 4,865,733 A | | 9/1989 | Tsuru et al. ................ | 210/266 |
| 4,874,511 A | | 10/1989 | Kawasaki et al. ....... | 210/198.2 |
| 5,085,781 A | | 2/1992 | Tsuru et al. ................ | 210/692 |
| 5,118,655 A | * | 6/1992 | Pedersen .................... | 502/412 |

(Continued)

OTHER PUBLICATIONS

"Guide Standard and Protocol for Testing Microbiological Water Purifiers," United States Environmental Protection Agency, Registration Division, Office of Pesticide Programs, Criteria and Standards Division, Office of Drinking Water, Report of Task Force, Submitted Apr., 1986, Revised Apr., 1987, pp. 1–39.

Bespalov, V., "Behavioral–Responses of *Escherichia–coli* to Changes in Redox Potential," *Proceedings of the National Academy of Sciences in the United States of America*, vol. 93, No. 19, pp. 10084–10089 (1996) IS–0027–8424.

de Sanchez, S., "Bacterial Chemo–Attractant Properties of Metal Ions From Dissolving Electrode Surfaces," *Journal of Electroanalytical Chemistry*, vol. 403, No. 1–2, pp. 39–45 (1996) IS–0022–0728.

Kaye, S.B., "Circumvention of Chemo–Resistance: An Overview," The European Cancer Conference, *European Journal of Cancer*, vol. 31A, No. S5, pp. 301 (1995) IS–0959–8049 Meeting Abstract.

*Primary Examiner*—Chester T. Barry
(74) *Attorney, Agent, or Firm*—Kilpatrick Stockton LLP

(57) ABSTRACT

A method and device for the filtration and/or purification of fluids water or other solutions containing microbiological contaminants, such as fluids containing including bacteria and/or viruses, where the fluid water is passed through a purification material composed of apatite and absorption media in a fixed binder matrix.

2 Claims, 1 Drawing Sheet

U.S. PATENT DOCUMENTS

| | | | |
|---|---|---|---|
| 5,122,274 A | 6/1992 | Heskett | 210/638 |
| 5,135,654 A | 8/1992 | Heskett | 210/638 |
| 5,147,722 A | 9/1992 | Koslow | 428/402 |
| 5,149,437 A | 9/1992 | Wilkinson et al. | 210/665 |
| 5,189,092 A | 2/1993 | Koslow | 524/495 |
| 5,198,118 A | 3/1993 | Heskett | 210/638 |
| 5,205,928 A | 4/1993 | Inove et al. | 210/198.2 |
| 5,215,657 A | 6/1993 | Goldfield et al. | 210/321.64 |
| 5,249,948 A | 10/1993 | Koslow | 425/376.1 |
| 5,298,205 A * | 3/1994 | Hayes et al. | 264/414 |
| 5,331,037 A | 7/1994 | Koslow | 524/496 |
| 5,422,340 A * | 6/1995 | Ammann et al. | 514/12 |
| 5,651,884 A | 7/1997 | Ichitsuka et al. | 210/198.2 |
| 5,676,745 A * | 10/1997 | Kelly et al. | 106/35 |
| 5,681,447 A * | 10/1997 | Maycock et al. | 205/536 |
| 5,755,969 A | 5/1998 | Okamoto | 210/691 |
| 5,792,513 A | 8/1998 | Koslow et al. | 427/195 |
| 6,458,162 B1 * | 10/2002 | Koblish et al. | 623/23.51 |
| 2002/0006427 A1 * | 1/2002 | Umezu et al. | 424/423 |

* cited by examiner

MICROBIOLOGICAL WATER FILTER

This application is a continuation of U.S. application Ser. No. 09/382,278, filed with the U.S. Patent Office on Aug. 25, 1999, now U.S. Pat. No. 6,187,192.

BACKGROUND OF THE INVENTION

1. Field of the Invention

This invention relates generally to the field of solution and fluid filters or purification devices, primarily to aqueous solution filters and water purification, devices for gases and water and other aqueous liquids, which remove contaminants from the gas or aqueous liquid solution passed through them. In its more particular aspects, the invention relates to the field of such devices that remove microbiological contaminants, including bacteria and viruses, from water or aqueous solutions.

2. Description of Related Art

Purification or filtration of water or other aqueous solutions is necessary for many applications, from the provision of safe or potable drinking water to biotechnology applications including fermentation processing and separation of components from biological fluids. Similarly, the removal of microbial organisms from breathable air in hospitals and clean rooms, where ultrapurified air is required, and in environments where the air will be recirculated, such as aircraft or spacecraft, is also an important application for filtration media. In recent years, the need for air filtration and purification in the home has become more recognized, and the competing concerns of energy efficiency and indoor air quality have lead to numerous air filtration products, such as HEPA filters and the like, that purport to remove small particles, allergens, and even microorganisms from the air.

There are many well known methods currently used for water purification, such as distillation, ion-exchange, chemical adsorption, filtering or retention, which is the physical occlusion of particulates. Particle filtration may be completed through the use of membranes or layers of granular materials, however in each case the pore size of the material and the space between the granular materials controls the particle size retained. Additional purification media include materials that undergo chemical reactions which alter the state or identity of chemical species in the fluid to be purified.

In most cases a combination of techniques are required in order to completely purify fluids, such as water. Combinations of technologies may be implemented by combining functions in a single device or using several devices in series where each performs a distinct function. Examples of this practice include the use of mixed resins that remove both negative and positively charged chemical species as well as species without charge Many of these water purification techniques and practices are costly, energy inefficient and/or require significant technical know-how and sophistication. Traditional means of reducing these complications require extensive processing or specially designed apparatus. Unfortunately, development of low cost techniques do not adequately address the removal of harmful biological contaminates, bacteria and viruses. For example, simple point-of-use purification devices, such as filters attached to in-house water supply conduits or portable units for campers and hikers, cannot sufficiently remove bacteria and viruses unless relatively costly membrane technology or strong chemical oxidizers, such as halogens or reactive oxygen species, are utilized.

The Environmental Protection Agency (EPA) has set forth minimum standards for acceptance of a device proposed for use as a microbiological water purifier. Common coliforms, represented by the bacteria *E. coli* and *Klebsiella terrigena*, must show a minimum 6-log reduction, 99.9999% of organisms removed, from an influent concentration of $1 \times 10^7/100$ ml. Common viruses, represented by poliovirus 1 (LSc) and rotavirus (Wa or SA-11), which show resistance to many treatment processes, must show a minimum 4 log reduction, 99.99% of organisms removed, from an influent concentration of $1 \times 10^7/L$. Cysts, such as those represented by *Giardia muris* or *Giardia lamblia,* are widespread, disease-inducing, and resistant to chemical disinfection. Devices that claim cyst removal must show a minimum 3 log reduction, 99.9% of cysts removed, from an influent concentration of $1 \times 10^6/L$ or $1 \times 10^7/L$, respectively. The EPA has accepted the use of other particles in the appropriate size range as a means of testing devices that claim this function.

Materials that are highly efficient at removing and immobilizing microbial organisms have numerous applications, but a particular area of application is in the biotechnology and fermentation industries. Not only would such materials be useful in the processing of fermentation broth for recycling or reuse, they also would have utility as microbial immobilization materials for the microbes of interest to the fermentation process.

It is known to use apatite, tricalcium phosphate and some derivatives thereof in granular, particulate or fiber form as a microbe binding agent. Apatite in the form of hydroxylapatite (HA) can be produced through wet-process chemical synthesis, the processing of animal bones, or the processing of phosphate-based minerals. Hydroxylapatite can function as a biological water purification agent through a complex process, which includes the chemical adsorption of biological materials and organisms.

An example of the use of HA, generated through a wet chemical synthetic method is shown by Okamoto in U.S. Pat. No. 5,755,969, which discloses the use of pure HA thin fibers or whiskers isolated in a particular crystal structure (a particular mean c-axis length and aspect ratio). The synthetic strategy and material processing methods were claimed to be unique. Okamoto further suggests at column 1, lines 60–67 that HA that has been obtained by extraction from natural organisms or synthesized by wet processes is generally poor in crystallinity and has poor adsorbability, and that if these materials are used as a microbe-removing material, the liquid permeability of the material cannot be assured.

There are no known commercially available filtration or purification devices incorporating HA compounds. Prior patent art and reported literature indicating the use of HA as a filtration material have never demonstrated capabilities which indicate that a device created with such materials could meet the minimum EPA requirements described above. For example, test data presented by Okamoto in U.S. Pat. No. 5,755,969 indicates that his device and other HA containing devices reduce viruses by only 99.76% at best.

Accordingly, there remains a need in this art for an uncomplicated, inexpensive fluid purification and filtration method and device incorporating apatite and/or hydroxylapatite. There is also a need for a practical fluid purification and filtration device and method that permits the use of apatite and/or hydroxylapatite in readily available and commonly found forms, such as those obtained by extraction from organisms or synthesized by a variety of different methods. There is also a need in the art for a method and device that not only meets, but significantly exceeds, the minimum EPA requirements for designation as a microbiological water purifier, such that the device is more than suitable for consumer and industry point-of-use applications.

SUMMARY OF THE INVENTION

To this end, the present inventors have discovered that one significant problem in the known HA-incorporating filter devices is that the HA is in loose form, whether granular, particulate, or fiber. The effectiveness of filters generated with materials in loose form is compromised by channeling and by-pass effects caused by the pressure of fluid, in particular, water and aqueous solutions, flowing through the filter media as well as particle erosion and aggregation. Because viruses and bacteria are removed by intimate contact with the adsorption material, even relatively small channels or pathways in the granular material formed over time by water pressure, water flow, particle erosion, or particle aggregation are easily sufficient to allow passage of undesirable microbiological contaminants through the filter.

For example, taking water as an exemplary fluid and using the material of the invention as a filtration medium for microbial organisms, calculations based on a virus influent concentration of $1\times10^6$/L show that where a 4-log reduction is to be expected, only a 3.7 log reduction actually occurs if only 0.01% of the water bypasses treatment by passing through channels formed in the filter media during filtration. If 0.1% of the water passes through untreated, then only a 3 log reduction occurs. If 1% passes through untreated, only a 2 log reduction occurs, and if 10% passes untreated, only a 1 log reduction occurs. Where a 6-log reduction is expected, the detrimental results of channeling are even more dramatic, with only a 4-log reduction actually occurring when 0.01% of the water bypasses treatment. This invention solves this problem by providing a microbiological filter and method for removing contaminants, including bacteria and viruses, where HA and other granular adsorptive filter media are fixed within a chemical binder material to form a porous filter material that eliminates the possibility of channeling and active agent by-pass.

This invention is in general a device and method for the purification and filtration of aqueous fluids, in particular water (such as drinking water or swimming or bathing water), or other aqueous solutions (such as fermentation broths and solutions used in cell culture), or gases and mixtures of gases such as breathable air, found in clean rooms, hospitals, diving equipment homes, aircraft, or spacecraft, and gases used to sparge, purge, or remove particulate matter from surfaces. The use of the device and method of the invention results in the removal of an extremely high percentage of microbiological contaminants, including bacteria and viruses and components thereof. In particular, the use of the device and method of the invention results in purification of water to a level that greatly surpasses the EPA standards for designation as a microbiological water purifier. In one embodiment, the invention relates to a purification material for fluids that contains particulate apatite that is in the form of a porous block as the result of the presence of a binder. Typically, at least a portion of this apatite is in the form of hydroxylapatite, and has been obtained from natural sources, e.g., as bone char, or from synthetic sources such as the mixing of calcium and phosphate containing compounds. Also typically, the binder is a polymeric or oligomeric material that is capable of maintaining the particulate apatite in a block structure. This allows the purification material to be molded or pressed into any desired shape, e.g., a shape suitable for inclusion into the housing of a filtration device, which provides for fluid inflow and outflow, and which filtration device has one or more chambers for contact of the fluid with the purification material. Such a device forms another embodiment of the invention. In addition to maintaining the apatite particles immobilized in a unitary block, the polymeric binder also provides desirable physical characteristics to the filter material, e.g., rendering it rigid or flexible, depending upon the type and amount of polymeric binder used.

In another embodiment, the invention relates to a purification material for fluids that is in the form of a sheet or membrane, containing the particulate apatite immobilized with a binder.

The invention also relates to methods of filtering fluids, such as water, aqueous solutions, and gases, to remove a large proportion of one or more types of microorganisms contained therein, by contacting the fluid with the purification material of the invention. In a particular aspect of this embodiment of the invention, this contacting occurs within the device described above, with the unfiltered fluid flowing through an inlet, contacting the purification material in one or more chambers, and the filtered fluid flowing out of the chamber through an outlet.

The purification material of the invention can be used to purify drinking water, to purify water used for recreational purposes, such as in swimming pools, hot tubs, and spas, to purify process water, e.g. water used in cooling towers, to purify aqueous solutions, including but not limited to, fermentation broths and cell culture solutions (e.g., for solution recycling in fermentation or other cell culture processes) and aqueous fluids used in surgical procedures for recycle or reuse, and to purify gases and mixtures of gases such as breathable air, for example, air recycled, e.g., in airplanes or spacecraft, and gases used to sparge, purge or remove volatile or particulate matter from surfaces, containers, or vessels. The purification material of the invention has the additional advantage of making use of readily available apatite materials, including those obtained from natural sources, while still maintaining high purification efficiency.

In yet another embodiment of the invention, the material of the invention, namely apatite and optionally other adsorptive materials in a binder matrix and formed into a block or sheet, can be used as an immobilization medium for microorganisms used in biotechnology applications such as fermentation processes and cell culture. In this embodiment, biological process fluids, such as nutrient broths, substrate solutions, and the like, are passed through the immobilization material of the invention in a manner that allows the fluids to come into contact with the microorganisms immobilized therein, and effluent removed from the material and further processed as needed.

DETAILED DESCRIPTION OF THE INVENTION

Figure 1:
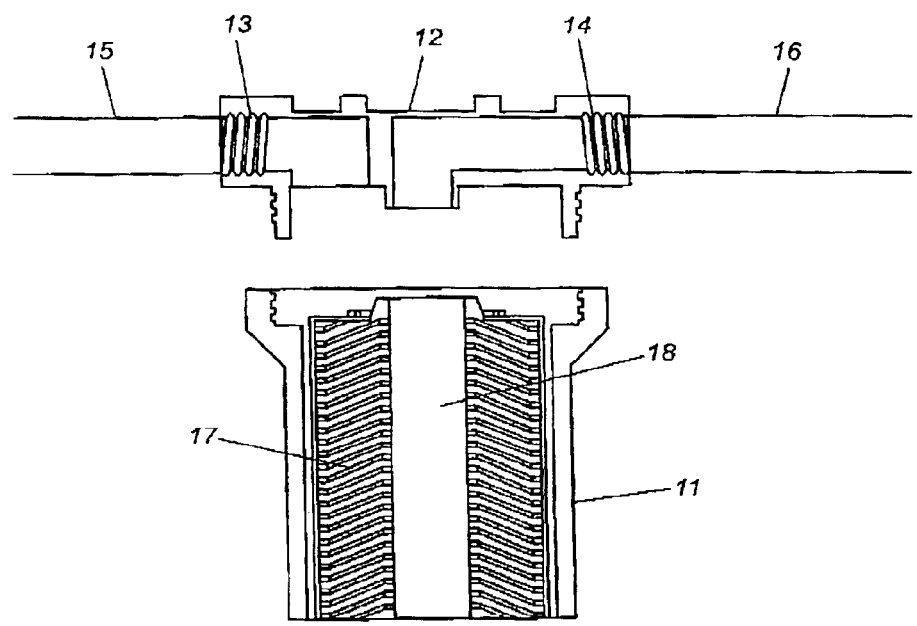
FIG. 1 is a cross-sectional view illustrating a particular embodiment of the invention, namely a water filter housing containing a block filter incorporating apatite and GAC in a binder matrix according to the invention.

As indicated above in the Summary, one embodiment of the invention relates to a purification material in the form of a block filter containing granulated apatite in a binder, which is typically a polymeric material. In a particular aspect of this embodiment, the invention relates to a rigid block filter that contains a mixture of granulated apatite and derivatives and granulated activated charcoal (GAC) or other adsorptive filter media in a binder material, such as a thermoplastic material, such that the apatite and derivatives and GAC are fixed within the binder matrix, and that channeling from flow during water treatment cannot occur. The purification material of the invention can be produced by extrusion, molding including injection molding, or by compression methods. Fibrillation may also be used to prepare fibrils of the mixture of binder polymer and apatite that can then be formed into a sheet, film, or block. It may be produced in any shape or size and may be rigid or flexible. The pore size of the filter block influences flow rates of the fluid through the filter, and is a function of the size of the granular particles incorporated into the filter block. As used herein, the term "block" does not denote any particular geometrical shape, but rather that the material is not a sheet or membrane. Nonlimiting examples of "blocks" as this term is intended to be used include tubes, annular rings, as well as more conventional geometrical solids. Material formed into flexible blocks is particularly suitable for use in pipes or tubes that serve as the fluid filter medium.

One of the desirable features of the purification material of the invention is that it may be formed into any desired shape, and thus provides ease of handling and use. For example, the purification material may be formed into a monolith or block that fits into conventional housings for filtration media or it can be shaped to provide purification as part of a portable or personal filtration system. Alternatively, the material may be formed into several different pieces, through which water flows in series or in parallel. Sheets or membranes of the purification material may also be formed. The rigidity of the purification material, whether in block form or in sheet/membrane form, may be altered through inclusion of flexible polymers in the binder material.

While not wishing to be bound by any theory, it is believed that the purification material of the invention achieves its unusually high efficiency in removing microorganisms from fluids partly as the result of the immobilization of the apatite particles in the binder, and the necessity for fluid flowing through the purification material to follow an extended and tortuous path therethrough, instead of forming channels through the purification material as occurs in prior apatite-containing purification materials. This path ensures that the fluid contacts a larger proportion of the surface area of the apatite particles, as well as preventing sustained laminar flow of the fluid through the filtration material. This latter effect is believed to help prevent laminae of fluid containing microorganisms from avoiding sustained contact with apatite particles in the filter. After the purification material has been in service for a period of time, additional filtration by occlusion will occur as adsorbed material accumulates in the pores of the purification material.

Those familiar with the art of fluid filtration will understand that the pore size and physical dimensions of the purification material may be manipulated for different applications and that variations in these variables will alter flow rates, back-pressure, and the level of microbiological contaminant removal. Likewise those knowledgeable in the art will recognize that variations in the percentages of each component of the purification material will provide some variability in utility. For example, increasing the percentage of apatite in the purification material will result in a material having an increased number of interaction sites for chemical and biological species, while increasing the percentage of binder will result in a purification material having material and mechanical properties closer to that of the binder material and with reduced interaction sites.

In one particular embodiment of the invention, the apatite used is in the form of bone char, and GAC material is present in approximately equal amounts with the percentage of binder material kept to a minimum. However, the apatite used in the invention may be obtained from other natural or synthetic sources and mixtures of the different derivatives can provide differences in the properties of the purification material. For example, adding fluoride to the filter block will result in a decreased reduction of fluoride in the effluent water if water is used as the fluid. This can be useful in, e.g. purifying fluorinated water in such a way as to maintain desirable fluorine levels therein. Fluoride in the filter material may be obtained either by inclusion of fluorapatite-rich apatite mixtures, inclusion of fluoride salts and compounds, or by preconditioning the purification material by passing fluoride-containing solutions therethrough.

Likewise, as the number of binding sites is increased through the use of different crystal structures and orientation of different crystal faces, the binding of metal ions, radioactive isotopes, and microorganisms can also be increased.

Those experienced in the art will also understand that different crystal lattices are possible for apatite and for other adsorbent materials used in the invention, and that these variations will yield differences in properties of the resulting purification material, as certain crystal structures improve and inhibit interactions with microorganisms and other biological materials. These differences in properties result from differences in interactions between the microorganisms and other biological materials and the different positive and negative ions that are included in the crystal structure.

In another embodiment of the invention, the purification material is constructed to withstand sterilization. Sterlization processes include thermal processes, such as steam sterilization or other processes wherein the purification material is exposed to elevated temperatures or pressures or both, resistive heating, radiation sterilization wherein the purification material is exposed to elevated radiation levels, including processes using ultraviolet, infrared, microwave, and ionizing radiation, and chemical sterilization, wherein the purification material is exposed to elevated levels of oxidants or reductants or other chemical species, and which is performed with chemicals such as halogens, reactive oxygen species, formaldehyde, surfactants, metals and gases such as ethylene oxide, methyl bromide, beta-propiolactone, and propylene oxide. Additionally, sterilization may be accomplished with electrochemical methods by direct oxidation or reduction with microbiological components or indirectly through the electrochemical generation of oxidative or reductive chemical species. Combinations of these processes are also used on a routine basis. It should also be understood that sterilization processes may be used on a continuous or sporadic basis while the purification material is in use.

In general, the invention comprises a device and a method for the filtration and purification of a fluid, in particular an aqueous solution or water, to remove organic and inorganic elements and compounds present in the water as particulate material. In particular, the device and method can be used to remove microbiological contaminants, including bacteria and viruses and components thereof, from water destined for consumption and use by humans and other animals. The method and device of the invention are particularly useful in these applications where the reduction in concentration of microbiological contaminants obtainable with the invention significantly exceeds the EPA standards for microbiological water purification devices, and also significantly exceeds the effectiveness of other known filtration and purification devices incorporating granulated adsorption media that contain apatite, such as those containing predominantly hydroxylapatite. In a particular embodiment of the invention, the purification material is a porous block formed by granulated or particulate apatite, which is defined herein to include hydroxylapatite, chlorapatite, and/or fluorapatite, and other optional adsorptive granular materials, described in more detail below, such as granulated activated charcoal (GAC), retained within a polymer binder matrix. In the method corresponding to this particular embodiment, the microbiological contaminants are removed from the water when the water is forced through the porous block by water pressure on the influent side, or by a vacuum on the effluent side, of the filter block.

In an embodiment of the invention where the purification material is composed of a mixture of hydroxylapatite and an adsorptive granular filter media, for example GAC, these components can be dispersed in a random manner throughout the block. The purification material can also be formed with spatially distinct gradients or separated layers, for example, where the hydroxylapatite and GAC granules are immobilized in separate layers using a solid binder matrix, for example a polymer thermoplastic such as polyethylene or the like, so that movement of the hydroxylapatite and GAC particles is precluded and detrimental channeling effects during fluid transport through the block are prevented. If the components reside in separate locations the fluid flow is sequential through these locations.

In a particular example of this embodiment, at least a portion of the apatite present is in the form of hydroxylapatite, which is added in the form of bone charcoal or bone char. An example of a suitable material is that designated as BRIMAC 216 and sold by Tate & Lyle Process Technology. The material may be ground to a desirable particle size, e.g., 80–325 mesh. A typical analysis of this material shows 9–11% carbon, up to 3% acid insoluble ash, up to 5% moisture, from approximately 70–76% hydroxylapatite (tricalcium phosphate), 7–9% calcium carbonate, 0.1–0.2% calcium sulfate and less than 0.3% iron (calculated as $Fe_2O_3$). This material is produced in a granular form having a total surface area of at least 100 $m^2/g$, a carbon surface area of at least 50 $m^2/g$, pore size distribution from 7.5–60,000 nm and pore volume of 0.225 $cm^3/g$. The element binding characteristics of this material have been reported and include chlorine, fluorine, aluminum, cadmium, lead, mercury (organic and inorganic), copper, zinc, iron, nickel, strontium, arsenic, chromium, manganese, and certain radionuclides. The organic molecule binding capabilities have been reported for complex organic molecules, color-forming compounds, compounds that add taste to fluids, compounds that add odors to fluids, trihalomethane precursors, dyestuffs, and tributyltin oxide.

The bone char (containing hydroxylapatite) and the GAC are in this example mixed in approximately equal amounts with the minimal amount of binder material necessary to compose a monolithic purification material. However, in the concentrations of HA, of GAC, and of binder are substantially variable, and materials having different concentrations of these materials may be utilized in a similar fashion without the need for any undue experimentation by those of skill in the art. In general, however, when GAC is used as the additional adsorbent material, its concentration in the mixture is generally less than 50% by weight, based upon the weight of the composition before any drying or compacting.

Additionally, adsorbents other than GAC may be substituted completely for, or mixed with, the GAC in a multicomponent mixture. Examples of these adsorbents include various ion-binding materials, such as synthetic ion exchange resins, zeolites (synthetic or naturally occurring), diatomaceous earth, and one or more other phosphate-containing materials, such as minerals of the phosphate class (as described in more detail below), in particular, minerals of the apatite group (as described in more detail below). In a particular embodiment, these additional adsorbents do not include more than 20% by weight of micronized manganese dioxide particles, and in a more particular embodiment, do not contain any substantial or readily detectable amount of micronized manganese dioxide particles.

Minerals of the phosphate class include minerals with a chemical unit of tetrahedral $(XO_4)_{-3}$ groups, where X is phosphorus, arsenic, vanadium or antimony. This chemical unit is often combined with metal ions in a one to one ratio or in a more complex combination with other ions such as hydroxide groups (OH), uranyl groups ($UO_2$), halogens or water molecules. Exemplary minerals of this class include: phosphates, such as alforsite (Barium Phosphate Fluoride Hydroxide), amblygonite (Lithium Sodium Aluminum Phosphate Fluoride Hydroxide), andrewsite (Copper Iron Phosphate Hydroxide), anapaite (Hydrated Calcium Iron Phosphate); apatite group minerals, such as arrojadite (Sodium Calcium Iron Manganese Phosphate), augelite (Aluminum Phosphate Hydroxide), barbosalite (Iron Phosphate Hydroxide), beraunite (Hydrated Iron Phosphate Hydroxide), belovite-(Ce) (Strontium Sodium Cerium Lanthanum Phosphate Fluoride Hydroxide), belovite-(La) (Strontium Sodium Lanthanum Cerium Phosphate Fluoride Hydroxide), berlinite (Aluminum Phosphate), and beryllonite (Sodium Beryllium Phosphate), carboniatefluorapatite (Calcium Carbonate Phosphate Fluoride), carboniatehydroxylapatite (Calcium Carbonate Phosphate Fluoride), chlorapatite (Calcium Phosphate Chloride), clinomimetite (Lead Arsenate Chloride), fermorite (Calcium Strontium Arsenate Phosphate Hydroxide), fluorapatite (Calcium Phosphate Fluoride), hydroxylapatite (Calcium Phosphate Hydroxide), hedyphane (Calcium Lead Arsenate Chloride), johnbaumite (Calcium Arsenate Hydroxide), mimetite (Lead Arsenate Chloride), morelandite (Barium Calcium Lead Arsenate Phosphate Chloride), pyromorphite (Lead Phosphate Chloride), strontiumapatite (Strontium Calcium Phosphate Hydroxide Fluoride), svabite (Calcium Arsenate Fluoride), turneaureite (Calcium Arsenate Phosphate Chloride), vanadinite (Lead Vanadate Chloride); beudanites, such as beusite (Manganese Iron Calcium Magnesium Phosphate), bolivarite (Hydrated Aluminum Phosphate Hydroxide), brazilianite (Sodium Aluminum Phosphate Hydroxide), brushite (Hydrated Calcium Phosphate Hydroxide), cacoxenite (Hydrated Iron Aluminum Phosphate Oxide Hydroxide), cassidyite (Hydrated Calcium Nickel Magnesium Phosphate), chalcosiderite (Hydrated Copper Iron Phosphate Hydroxide), childrenite (Hydrated Iron Manganese Aluminum Phosphate Hydroxide), churchite-(Y) (Hydrated Yttrium Erbium Phosphate), collinsite (Hydrated Calcium Magnesium Iron Phosphate), cornetite (Copper Phosphate Hydroxide), crandallite (Hydrated Calcium Aluminum Phosphate Hydroxide), cyrilovite (Hydrated Sodium Iron Phosphate Hydroxide), diadochite (Hydrated Iron Sulfate Phosphate Hydroxide), dickinsonite (Hydrated Manganese Iron Calcium Magnesium Phosphate Hydroxide), dufrenite (Hydrated Iron Phosphate Hydroxide), embreyite (Hydrated Lead Chromate Phosphate), englishite (Hydrated Potassium Calcium Aluminum Phosphate Hydroxide), eosphorite (Hydrated Manganese Aluminum Phosphate Hydroxide), evansite (Hydrated Aluminum Phosphate Hydroxide), fairfieldite (Hydrated Calcium Manganese Iron Phosphate), faheyite (Hydrated Manganese Magnesium Sodium Beryllium Iron Phosphate), faustite (Hydrated Zinc Copper Aluminum Phosphate Hydroxide), fillowite (Hydrated Sodium Manganese Iron Calcium Phosphate Hydroxide), florencite (Cerium Aluminum Phosphate Hydroxide), frondelite (Manganese Iron Phosphate Hydroxide), gorceixite (Hydrated Barium Aluminum Phosphate Hydroxide), gordonite (Hydrated Magnesium Aluminum Phosphate Hydroxide), gormanite (Hydrated Iron Aluminum Phosphate Hydroxide), goyazite (Strontium Aluminum Phosphate Hydroxide), graftonite (Iron Manganese Calcium Phosphate), griphite (Sodium Aluminum Calcium Iron Manganese Phosphate Hydroxide), hagendorfite (Sodium Calcium Iron Manganese Phosphate), hentschelite (Copper Iron Phosphate Hydroxide), herderite (Calcium Beryllium Phosphate Fluoride Hydroxide), heterosite (Iron Manganese Phosphate), hopeite (Hydrated Zinc Phosphate), holtedahlite (Magnesium Phosphate Carbonate Hydroxide Oxide), hureaulite (Hydrated Manganese Phosphate Hydroxide), hurlbutite (Calcium Beryllium Phosphate), jahnsite (Hydrated Calcium Manganese Magnesium Iron Phosphate Hydroxide), kidwellite (Hydrated Sodium Iron Phosphate Hydroxide), kulanite (Barium Iron Manganese Magnesium Aluminum Phosphate Hydroxide), landesite (Hydrated Manganese Iron Phosphate Hydroxide), laubmannite (Iron Phosphate Hydroxide), laueite (Hydrated Manganese Iron Phosphate Hydroxide), lazulite (Magnesium Iron Aluminum Phosphate Hydroxide), leucophosphite (Hydrated Potassium Iron Phosphate Hydroxide), libethenite (Copper Phosphate Hydroxide), lipscombite (Iron Manganese Phosphate Hydroxide), lithiophilite (Lithium Manganese Iron Phosphate), ludlamite (Hydrated Magnesium Iron Manganese Phosphate), messelite (Hydrated Calcium Iron Manganese Phosphate), meta-variscite (Hydrated Aluminum Phosphate), meta-vauxite (Hydrated Iron Aluminum Phosphate Hydroxide), mitridatite (Hydrated Calcium Iron Phosphate Hydroxide), monazite (rare earth Phosphate), monetite (Calcium Hydro-Phosphate), montbrasite (Lithium Sodium Aluminum Phosphate Hydroxide Fluoride), montgomeryite (Hydrated Calcium Aluminum Phosphate Hydroxide), moraesite (Hydrated Beryllium Phosphate Hydroxide), natramblygonite (Sodium Lithium Aluminum Phosphate Fluoride Hydroxide), natrophilite (Sodium Magnesium Phosphate), newberyite (Hydrated Magnesium Hydro-Phosphate), nissonite (Hydrated Copper Magnesium Phosphate Hydroxide), overite (Hydrated Calcium Magnesium Aluminum Phosphate Hydroxide), palermoite (Lithium Sodium Strontium Calcium Aluminum Phosphate Hydroxide), paraschozite (Hydrated Calcium Zinc Phosphate), paravauxite (Hydrated Iron Aluminum Phosphate Hydroxide), phosphoferrite (Hydrated Iron Manganese Phosphate), phosphophyllite (Hydrated Zinc Iron Manganese Phosphate), phosphosiderite (Hydrated Iron Phosphate), plumbogummite (Lead Aluminum Hydro-Phosphate Hydroxide), pseudomalachite (Copper Phosphate Hydroxide), pucherite (Bismuth Vanadate), purpurite (Manganese Phosphate), reddingite (Hydrated Manganese Iron Phosphate), rhabdophane (Hydrated Cerium Lanthanum Neodymium Yttrium Phosphate), rockbridgeite (Iron Manganese Phosphate Hydroxide), roscherite (Hydrated Calcium Manganese Iron Beryllium Phosphate Hydroxide), rosemaryite (Sodium Calcium Manganese Iron Magnesium Aluminum Phosphate), salmonsite (Hydrated Manganese Iron Phosphate), scholzite (Hydrated Calcium Zinc Phosphate), scorzalite (Iron Magnesium Aluminum Phosphate Hydroxide), sicklerite (Lithium Manganese Iron Phosphate), sincosite (Hydrated Calcium Vanadate Phosphate), spencerite (Hydrated Zinc Phosphate Hydroxide), stercorite (Hydrated Sodium Ammonium Hydro-Phosphate), stewartite (Hydrated Manganese Iron Phosphate Hydroxide), strengite (Hydrated Iron Phosphate), strunzite (Hydrated Manganese Iron Phosphate Hydroxide), struvite (Hydrated Ammonium Magnesium Phosphate), switzerite (Hydrated Manganese Iron Phosphate), tarbuttite (Zinc Phosphate Hydroxide), tavorite (Lithium Iron Phosphate Hydroxide), triphylite (Lithium Iron Manganese Phosphate), triplite (Manganese Iron Magnesium Calcium Phosphate Fluoride Hydroxide), triploidite (Manganese Iron Phosphate Hydroxide), trolleite (Aluminum Phosphate Hydroxide), tsumebite (Lead Copper Phosphate Sulfate Hydroxide), turquoise (Hydrated Copper Aluminum Phosphate Hydroxide), variscite (Hydrated Aluminum Phosphate), vauxite (Hydrated Iron Aluminum Phosphate Hydroxide), veszelyite (Hydrated Copper Zinc Phosphate Hydroxide), vivianite (Hydrated Iron Phosphate), wagnerite (Magnesium Iron Manganese Calcium Phosphate Fluoride), wardite (Hydrated Sodium Aluminum Phosphate Hydroxide), wavellite (Hydrated Aluminum Phosphate Hydroxide Fluoride), whiteite (Hydrated Calcium Magnesium Iron Manganese Aluminum Phosphate Hydroxide), whitlockite (Calcium Magnesium Phosphate), wolfeite (Iron Manganese Phosphate Hydroxide), and xenotime (Yttrium Phosphate); and/or uranyl phosphates, such as autunite (Hydrated Calcium Uranyl Phosphate), coconinoite (Hydrated Iron Aluminum Uranyl Phosphate Sulfate Hydroxide), dumontite (Hydrated Lead Uranyl Phosphate Hydroxide), meta-ankoleite (Hydrated Potassium Uranyl Phosphate), meta-autunite (Hydrated Calcium Uranyl Phosphate), meta-torbernite (Hydrated Copper Uranyl Phosphate), meta-uranocircite (Hydrated Barium Uranyl Phosphate), parsonite (Hydrated Lead Uranyl Phosphate), phosphuranylite (Hydrated Calcium Uranyl Phosphate Hydroxide), phuralumite (Hydrated Aluminum Uranyl Phosphate Hydroxide), phurcalite (Hydrated Calcium Uranyl Phosphate Hydroxide), renardite (Hydrated Lead Uranyl Phosphate Hydroxide), sabugalite (Hydrated Aluminum Uranyl Hydro-Phosphate), saleeite (Hydrated Magnesium Uranyl Phosphate), torbernite (Hydrated Copper Uranyl Phosphate), uramphite (Hydrated Ammonium Uranyl Phosphate), and uranocircite (Hydrated Barium Uranyl Phosphate).

In particular, minerals of the apatite group, i.e., a group of phosphates, arsenates, and vanadates having similar hexagonal or pseudohexagonal monoclinic structures, and having the general formula $X_5(ZO_4)_3$ (OH, F, or Cl), wherein each X can independently be a cation such as calcium, barium, sodium, lead, strontium, lanthanum, and/or cerium cation, and wherein each Z can be a cation such as phosphorus, vanadium, or arsenic are particularly suitable for the invention. The $ZO_4$ species can be substituted to a limited extent by carbonate or silicate anions.

Additionally, polymeric materials used for ion-binding including derivatised resins of styrene and divinylbenzene, and methacrylate may be used. The derivatives include functionalized polymers having anion binding sites based on quaternary amines, primary and secondary amines, aminopropyl, diethylaminoethyl, and diethylaminopropyl substituents. Derivatives including cation binding sites include polymers functionalized with sulfonic acid, benzenesulfonic acid, propylsulfonic acid, phosphonic acid, and/or carboxylic acid moieties.

Natural or synthetic zeolites may also be used or included as ion-binding materials, including, e.g., naturally occurring aluminosilicates such as clinoptilolite.

Suitable binder materials include any polymeric material capable of aggregating the particulate materials together and maintaining this aggregation under the conditions of use. They are generally included in amounts ranging from about 10 wt % to about 99.9 wt %, more particularly from about 15 wt % to about 50 wt %, based upon the total weight of the purification material. Suitable polymeric materials include both naturally occurring and synthetic polymers, as well as synthetic modifications of naturally occuring polymers. The polymeric binder materials generally include one or more thermoset, thermoplastic, elastomer, or a combination thereof, depending upon the desired mechanical properties of the resulting purification material.

In general, polymers melting between about 50° C. and about 500° C., more particularly, between about 75° C. and about 350° C., even more particularly between about 80° C. and about 200° C., are suitable polymeric binders for the invention. For instance, polyolefins melting in the range from about 85° C. to about 180° C., polyamides melting in the range from about 200° C. to about 300° C., and fluorinated polymers melting in the range from about 300° C. to about 400° C., can be particularly mentioned as suitable. Examples of types of polymers suitable for use as binders in the invention include, but are not limited to, thermoplastics, polyethylene glycols or derivatives thereof, polyvinyl alcohols, polyvinylacetates, and polylactic acids. Suitable thermoplastics include, but are not limited to, nylons and other polyamides, polyethylenes, including LDPE, LLDPE, HDPE, and polyethylene copolymers with other polyolefins, polyvinylchlorides (both plasticized and unplasticized), fluorocarbon resins, such as polytetrafluoroethylene, polystyrenes, polypropylenes, cellulosic resins, such as cellulose acetate butyrates, acrylic resins, such as polyacrylates and polymethylmethacrylates, thermoplastic blends or grafts such as acrylonitrile-butadiene-styrenes or acrylonitrilestyrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenolformaldehyde resins, such as resols and novolacs. Those of skill in the art will recognize that other thermoplastic polymers can be used in the invention in an analogous manner.

Suitable thermoset polymers for use as, or inclusion in, the binder used in the invention include, but are not limited to, polyurethanes, silicones, fluorosilicones, phenolic resins, melamine resins, melamine formaldehyde, and urea formaldehyde. Suitable elasomers for use as or inclusion in, the binder used in the invention include but are not limited to natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylenepropylene-diene terpolymers, chlorinated polyethylene, VITON (fluoroelastomer), and ZALAK (Dupont-Dow elastomer).

Those of skill in the art will realize that some of the thermoplastics listed above can also be thermosets, depending upon the degree of crosslinking, and that some of each may be elastomers, depending upon their mechanical properties, and that the particular categorization used above is for ease of understanding and should not be regarded as limiting or controlling.

Naturally occurring and synthetically modified naturally occurring polymers suitable for use in the invention include, but are not limited to, natural and synthetically modified celluloses, such as cotton, collagens, and organic acids. Biodegradable polymers suitable for use in the invention include, but are not limited to, polyethylene glycols, polylactic acids, polyvinylalcohols, co-polylactideglycolides, and the like.

In the specific embodiment of a filter material that may be sterilized the apatite used is in the form of bone char, and GAC material is present in approximately equal amounts with the percentage of binder material kept to a minimum. The binder used must be stable to the temperature, pressure, electrochemical, radiative, and chemical conditions presented in the sterilization process, and should be otherwise compatible with the sterilization method. Examples of binders suitable for sterilization methods involving exposure to high temperatures (such as steam sterilization or autoclaving) include cellulose nitrate, polyethersulfone, nylon, polypropylene, polytetrafluoroethylene (teflon), and mixed cellulose esters. Purification materials prepared with these binders can be autoclaved when the binder polymers are prepared according to known standards. Desirably, the purification material is stable to both steam sterilization or autoclaving and chemical sterilization or contact with oxidative or reductive chemical species, as this combination of sterilizing steps is particularly suitable for efficient and effective regeneration of the purification material In the embodiment of the invention wherein sterilization is at least in part conducted through the electrochemical generation of oxidative or reductive chemical species, the electrical potential necessary to generate said species can be attained by using the purification material itself as one of the electrodes. For example, the purification material, which contains polymeric binder, can be rendered conductive through the inclusion of a sufficiently high level of conductive particles, such as GAC, carbon black, or metallic particles to render a normally insulative polymeric material conductive. Alternatively, if the desired level of carbon or other particles is not sufficiently high to render an otherwise insulative polymer conductive, an intrinsically conductive polymer may be used as or blended into the binder. Examples of suitable intrinsically conductive polymers include doped polyanilines, polythiophenes, and other known intrinsically conductive polymers. These materials can be incorporated into the binder in sufficient amount to provide a resistance of less than about 1 k$\Omega$, more particularly less than about 300 $\Omega$.

The purification material of the present invention need not be in the form of a block, but may also be formed into a sheet or film. This sheet or film may, in a particular embodiment, be disposed on a woven or nonwoven web of, e.g., a polymer. The polymer used to form the woven or nonwoven web may be any thermoplastic or thermosetting resin typically used to form fabrics. Polyolefins, such as polypropylene and polyethylene are particularly suitable in this regard.

The efficiency of the purification material and the method for using it to reduce microbiological contaminants, as well as the flow rate of the fluid through the material, are a function of the pore size within the block and the influent fluid pressure. At constant fluid pressure, flow rate is a function of pore size, and the pore size within the block can be regulated by controlling the size of the HA and GAC granules—large granule size providing a less dense, more open purification material which results in a faster flow rate, and small granule size providing a more dense, less open purification material which results in a slower flow rate. A block 17 formed with relatively large HA granules will have less surface area and interaction sites than a block formed with smaller granules, and therefore the purification material of large granules must be of thicker dimension to achieve equal removal of microbiological contaminants. Because these factors are controllable within the manufacturing process, the purification materials can be customized by altering pore size, block volume and block outer surface area and geometric shape to meet different application criteria. Average pore size in a particular embodiment is kept to below several microns and more particularly to below about one micron, to preclude passage of cysts. It should be noted that the pore size described herein does not refer to the pores within the apatite or other adsorbent particles themselves, but rather to the pores formed within the purification material when the particles are aggregated together by the binder.

The method of making the material of the invention, in its most general aspect, involves combining the particulate apatite (and optional additional particulate adsorbent material(s)) with the binder material under conditions of pressure and temperature that allow at least a portion of the binder to be present in liquid form and that allow for compaction of the particulate, and then solidifying the binder around and/or between the particles. The precise nature of the production process will depend to a certain extent upon the nature of the binder material.

For example, if the binder material is supplied in the form of a liquid solution, suspension, or emulsion (e.g., in a volatile solvent), it may be contacted with the particles by dipping or spraying, and the wet particles compressed in a mold, which may be optionally heated to evaporate any necessary solvent. The resulting molded material is then dried to form the purification material of the invention.

If, on the other hand, the binder is a polymer resin, it will typically be mixed in pellet form with the particles of the adsorbent material, and the resulting mixture heated and extruded or molded into the desired shape. Examples of suitable particulate/binder extrusion processes and equipment are disclosed in U.S. Pat. Nos. 5,189,092; 5,249,948; and 5,331,037. Other extrusion equipment and processes may also be used, however. Moreover, the mixture may be heated and injection molded, without the need for any extrusion. Additionally, the binder, a thermoset, may be generated through a crosslinking process that incorporates initiation by chemical processes, electrochemical processes, irradiation and through physical parameters of temperature and pressure variations.

With reference to the drawings, the invention will now be described with regard to one particular embodiment and a mode of practicing it, which significantly exceeds the EPA requirements for microbiological filters. FIG. 1 illustrates a typical specific embodiment of filtration apparatus containing the purification material of the invention, which incorporates a rigid porous block filter. A removable housing 11 is mated with a cap 12, the cap 12 having an inflow orifice 13 and an outflow orifice 14. A water supply conduit 15 is joined to the inflow orifice 13 to deliver non-treated water into the device, and a water discharge conduit 16 is joined to the outflow orifice 14 to conduct treated water from the device. Water passes into the housing 11 and the pressure of the water flow forces it through the porous block filter member 17, which as shown is formed in the shape of hollow cylinder with an axial bore 18, the treated water passing into the axial bore 18 which connects to the outflow orifice 14. FIG. 1 is provided as a representative illustration of one possible configuration. It is to be understood that other configurations where water is caused to pass through a porous filter block (which may have different geometrical shapes and/or different flow properties) are contemplated to be within the scope of the invention. The block 17 may be formed by any of a number of known methods, such as by extrusion, compression, molding, sintering or other techniques.

Figures 2A, 2B:
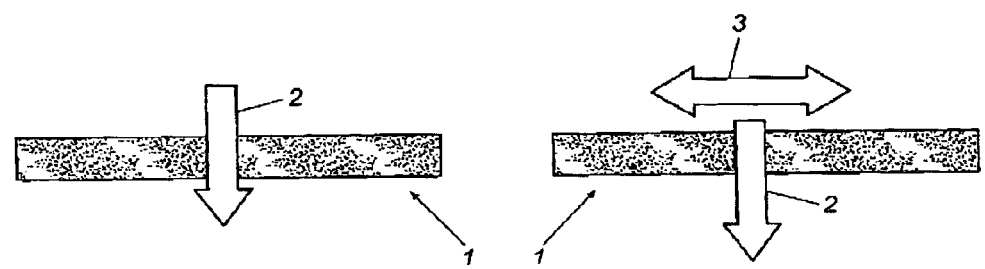
FIGS. 2a and 2b are schematic views of a particular embodiment of the invention, namely a filter material containing apatite and a binder matrix in the form of a membrane or sheet.

FIG. 2 shows two embodiments where the purification material of the invention is used in the form of a sheet or film. FIG. 2a shows purification material 1 used in connection with normal flow-through filtration, indicated by arrow 2, which represents the fluid being filtered by passage through the sheet or film 1. FIG. 2b shows purification material 1 used in connection with crossflow filtration. Fluid flowing across the filter is indicated by double-headed arrow 3, while fluid flowing through the purification material 1 is indicated by arrow 2. The cross flow fluid indicated by arrow 3 sweeps across the surface of the purification material 1, decreasing the level of particulate matter deposited thereon.

EXAMPLE 1

As example of a fully functional device, a cylindrical filter block 17 of the shape shown in FIG. 1 was prepared with a material composition of approximately 42.5% BRIMAC 216 bone char obtained from Tate and Lyle, approximately 42.5% GAC obtained from KX Industries, and approximately 15% thermoplastic binder material selected from one or more of the thermoplastics described above.

The material was then extruded at a temperature that provided a uniform mixture of apatite, GAC, and thermoplastic binder.

The cylindrical or toroidally shaped block 17 was approximately 9.8 inches in length, with an outer diameter of approximately 2.5 inches and an inner diameter (the bore 18) of approximately 1.25 inches. This shape filter fits into a standard water filtration housing used in the home and industrial settings. The filter material had a resistance of about 300 Ω.

EXAMPLE 2

The filter prepared in Example 1 was challenged by exposing it to tap water that was filtered with activated carbon and then seeded with $2.3 \times 10^8$ colony forming units per liter of *E. coli* bacteria and $1.0 \times 10^7$ plaque forming units per liter of poliovirus type 1. The seeded water was passed through the filter block 17 at a flow rate of approximately 2 liters/minute for 3 minutes, followed by collection of a 500 ml effluent sample. The results of microbiological measurements on this 500 ml sample are presented in Table 1. *E. coli* was assayed on m-Endo agar plates by membrane filtration procedure, while the poliovirus type 1 was assayed by the plaque forming method on BGM cells. The results shown in Table 1 exceed the minimum EPA requirements for removal of bacteria and viruses

TABLE 1

| Unit | Organism | Influent | Effluent | % reduction | log reduction |
|---|---|---|---|---|---|
| Single Unit | *E. coli* | $2.3 \times 10^8$ | <10 | >99.999995 | 7.36 |
| Two Units | *E. coli* | $2.3 \times 10^8$ | <10 | >99.999995 | 7.36 |
| Single Unit | Polio type 1 | $1.0 \times 10^7$ | $3.3 \times 10^2$ | 99.996 | 4.49 |
| Two Units | Polio type 1 | $1.0 \times 10^7$ | $<3.3 \times 10^2$ | >99.996 | >4.49 |

EXAMPLE 3

A second test was performed using the same seeded water as used in Example 2, and using two blocks prepared according to Example 1 in series. The results of effluent testing are also provided in Table 1. A comparison of performance between a single unit and a double unit with the units arranged in series demonstrates that one unit is sufficient to reach the detection limits of the assay and provide results that exceed the requirements of the EPA.

EXAMPLE 4

A second series of tests was performed using a different mixture of microbial contaminants. Tap water was filtered through activated carbon and then seeded with $4.6 \times 10^8$ colony forming units per liter of K terrigena bacteria and $2.4 \times 10^8$ plaque forming units per liter of bacteriophage MS-2. The inorganic and organic dissolved solids were adjusted to the EPA challenge water specifications. This challenge water was passed through both a single unit filter block 17 at a flow rate of about 2 liters/minute for 3 minutes, followed by collection of a 500 ml effluent sample and through a double unit which placed two blocks in series. K. terrigena was assayed on m-Endo agar plates by membrane filtration procedure, while the MS-2 was assayed by the double agar layer technique. The results of these two trials are presented in Table 2. Again the results demonstrated that the device and method exceed the EPA requirements for a microbiological filter.

TABLE 2

| Unit | Organism | Influent | Effluent | % reduction | log reduction |
| --- | --- | --- | --- | --- | --- |
| Single Unit | K. terrigena | $4.6 \times 10^8$ | <10 | >99.999998 | 7.66 |
| Double Unit | K. terrigena | $4.6 \times 10^8$ | <10 | >99.999998 | 7.66 |
| Single Unit | MS-2 | $2.4 \times 10^8$ | $2.3 \times 10^4$ | 99.990 | 4.02 |
| Double Unit | MS-2 | $2.4 \times 10^8$ | $<1 \times 10^3$ | >99.9996 | >5.38 |

EXAMPLE 5

Comparative testing between the filter and method of this invention and the standard method of using granular activated carbon and bone char in a container was performed. A filter housing containing a 50:50 mixture of bone char and GAC in granular form with no binder material was constructed and challenged in a manner similar to that used in the Examples described above. The results are shown in Table 3. When these results are compared to those presented in Table 1 for the block filter a clear, unambiguous, and unexpected improvement is obtained with the filter and method of the invention. Although the filter unit constructed with granular materials and no binder is composed materially of the same active filtering agents as the porous block filter 17 of the invention, it is virtually useless as a microbiological contaminant filter, allowing over 12% of the E. coli and almost 8% of the poliovirus to pass through the filter media.

TABLE 3

| Unit | Organism | Influent | Effluent | % reduction |
| --- | --- | --- | --- | --- |
| (block) | E. coli | $2.3 \times 10^8$ | <10 | >99.999995 |
| (granular) | E. coli | $5.8 \times 10^8$ | $7.23 \times 10^7$ | 87.53 |
| (block) | Poliovirus type 1 | $1.0 \times 10^7$ | $3.3 \times 10^2$ | 99.996 |
| (granular) | Poliovirus type 1 | $7.9 \times 10^7$ | $6.1 \times 10^6$ | 92.27 |

As described above, the material of the invention is extremely useful in the area of water purification, particularly the area of drinking water purification. Because of the extremely high efficiency with which the material of the present invention removes microorganisms from water, it meets and exceeds the EPA guidelines for materials used as microbiological water purifiers. In addition to functioning as a purifier for drinking water, the material of the invention can also be used to purify water used for recreational purposes, such as water used in swimming pools, hot tubs, and spas.

As the result of the ability of the material of the invention to efficiently remove and immobilize microorganisms and other cells from aqueous solutions, it has numerous applications in the pharmaceutical and medical fields. For example, the material of the invention can be used to fractionate blood by separating blood components, e.g., plasma, from blood cells, and to remove microorganisms from other physiological fluids.

The material can also be used in hospital or industrial areas requiring highly purified air having extremely low content of microorganisms, e.g., in intensive care wards, operating theaters, and clean rooms used for the therapy of immunosuppressed patients, or in industrial clean rooms used for manufacturing electronic and semiconductor equipment.

The material of the invention has multiple uses in fermentation applications and cell culture, where it can be used to remove microorganisms from aqueous fluids, such as fermentation broths or process fluids, allowing these fluids to be used more efficiently and recycled, e.g., without cross-contamination of microbial strains. In addition, because the material is so efficient at removing microorganisms and at retaining them once removed, it can be used as an immobilization medium for enzymatic and other processing requiring the use of microorganisms. A seeding solution containing the desired microorganisms is first forced through the material of the invention, and then substrate solutions, e.g., containing proteins or other materials serving as enzymatic substrates, are passed through the seeded material. As these substrate solutions pass through the material, the substrates dissolved or suspended therein come into contact with the immobilized microorganisms, and more importantly, with the enzymes produced by those microorganisms, which can then catalyze reaction of the substrate molecules. The reaction products may then be eluted from the material by washing with another aqueous solution.

The material of the invention has numerous other industrial uses, e.g., filtering water used in cooling systems. Cooling water often passes through towers, ponds, or other process equipment where microorganisms can come into contact with the fluid, obtain nutrients and propagate. Microbial growth in the water is often sufficiently robust that the process equipment becomes clogged or damaged and requires extensive chemical treatment. By removing microorganisms before they are able to propagate substantially, the present invention helps to reduce the health hazard associated with the cooling fluids and the cost and dangers associated with chemical treatment programs.

Similarly, breathable air is often recycled in transportation systems, either to reduce costs (as with commercial airliners) or because a limited supply is available (as with submarines and spacecraft). Efficient removal of microorganisms permits this air to be recycled more safely. In addition, the material of the invention can be used to increase indoor air quality in homes or offices in conjunction with the air circulation and conditioning systems already in use therein. The purification material of the invention can also be used to purify other types of gases, such as anesthetic gases used in surgery or dentistry (e.g., nitrous oxide), gases used in the carbonated beverage industry (e.g., carbon dioxide), gases used to purge process equipment (e.g., nitrogen, carbon dioxide, argon), and/or to remove particles from surfaces, etc.

In each of these applications, the method of using the material of the invention is relatively simple and should be apparent to those of skill in the filtration art. The fluid to be filtered is simply conducted to one side of a block or sheet of material of the invention, typically disposed in some form of housing, and forced through the material as the result of a pressure drop across the purification material. Purified, filtered fluid is then conducted away from the "clean" side of the filter and further processed or used.

The invention having been thus described by reference to certain of its specific embodiments, it will be apparent to those of skill in the art that many variations and modifications of these embodiments may be made within the spirit of the invention, which are intended to come within the scope of the appended claims and equivalents thereto.

What is claimed is:

1. An immobilization and contacting medium for microorganisms, comprising apatite and a binder therefore, wherein the medium is in a rigid, porous form selected from a block or a sheet, further wherein the medium is constructed and arranged to immobilize microorganisms on a surface of the pores of the medium while also being constructed and arranged to permit an external agent to contact the immobilized microorganisms.

2. The immobilization and contacting medium of claim 1, further comprising one or more microorganisms disposed within the pores thereof.

* * * * *